T. J. LAVERE.
VEHICLE BRAKE.
APPLICATION FILED DEC. 11, 1913.
1,228,033. Patented May 29, 1917.
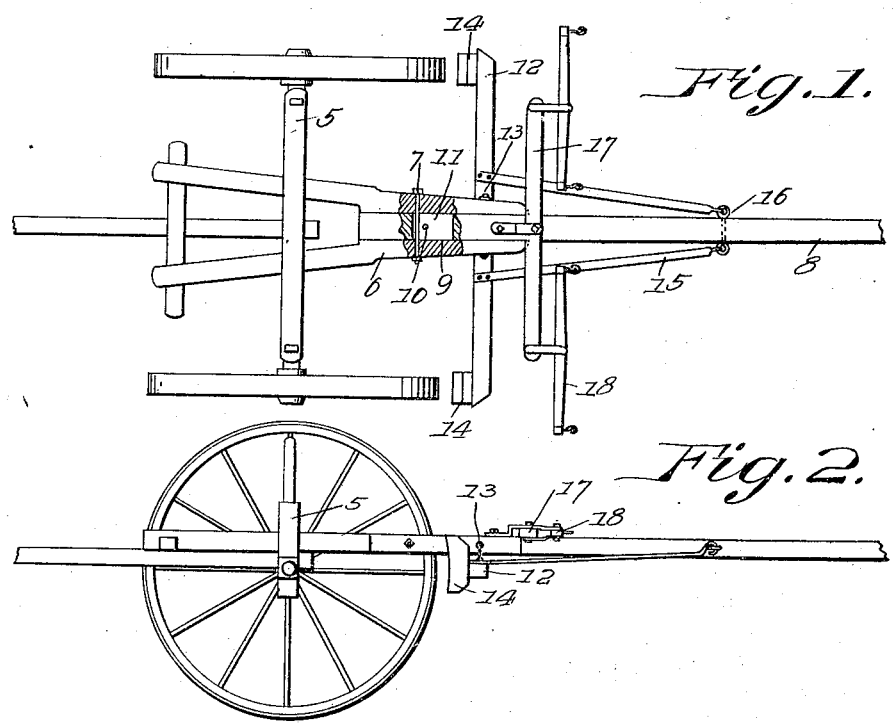

UNITED STATES PATENT OFFICE.

THOMAS J. LAVERE, OF BETHEL, VERMONT.

VEHICLE-BRAKE.

1,228,033.                    Specification of Letters Patent.         Patented May 29, 1917.

Application filed December 11, 1913.  Serial No. 806,024.

*To all whom it may concern:*

Be it known that I, THOMAS J. LAVERE, a citizen of the United States of America, and resident of Bethel, in the county of Windsor and State of Vermont, have invented certain new and useful Improvements in Vehicle-Brakes, of which the following is a specification.

This invention relates to vehicles and particularly vehicles provided with means whereby the brakes may be operated by two horses by a backward pull on the tongue of a two horse vehicle and I therefore do not wish to be limited with respect to the details of constructions or to the manner of use.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a plan view of the front truck of a wagon with the invention applied thereto;

Fig. 2 illustrates a side elevation thereof.

In these drawings 5 denotes the front truck of a wagon with the hounds 6 connected by a bolt 7. A tongue 8 has its rear end slidable between the hounds and is provided with a slot 9 through which the bolt 7 extends so that longitudinal movement is afforded the tongue coextensive with the length of the slot, although provision is made for preventing movement of the tongue with relation to the bolt in that a pin 10 is insertible in an aperture 11 of the tongue, the said pin being adapted to contact with the bolt 7 to prevent movement of the tongue. The pin is used principally to guard against the application of the brakes when it is desired to back the vehicle as when the animals move rearwardly in backing the vehicle. At such times, the pin is inserted in the aperture of the tongue as stated, to prevent application of the brakes.

The brake beam 12 is slidably supported in any appropriate way as by the links 13 suspended from the hounds and the brake beam has the usual brake shoes 14 which are adapted for contact with the peripheries of the wheel.

The links 15 are connected to the brake beam 12 on each side of the hounds and the links extend forwardly and are connected to the bolt 16 extending through the tongue 8, thus movement of the tongue communicates motion to the brake beam for applying the brakes when the tongue is moved rearwardly, whereas when the tongue is pulled forward, the brake shoes are drawn from the peripheries of the wheels. The tongue 8 is supplied with a double tree 17 and the swingletrees 18 which may be of any ordinary construction and as the details of these elements do not form the subject matter of the invention, they are not described in detail.

I claim:

In a brake for vehicles, hounds supported adjacent the forward end of the vehicle, said hounds being spaced apart to provide a clearance, a tongue having one of its ends positioned in said clearance, said tongue having a transverse slot, a bolt connecting the hounds, said bolt extending through the slot for connecting the tongue with the hounds, a pin extending vertically through the tongue and connecting the walls of the slot at a point adjacent the bolt, whereby movement of the tongue in one direction is restricted by the engagement of said pin with the bolt, and a brake bar carrying brake shoes, links for supporting the brake bar and links connecting the brake bar and the tongue, whereby movement of said tongue operates the brake shoes.

In testimony whereof, I affix my signature in the presence of two witnesses.

THOMAS J. LAVERE.

Witnesses:
J. WESLEY MILLER,
J. T. MOODY.

Copies of this patent may be obtained for five cents each, by addressing the "Commissioner of Patents, Washington, D. C."